United States Patent [19]

Kuroda

[11] Patent Number: 4,862,252
[45] Date of Patent: Aug. 29, 1989

[54] Y/C SEPARATOR CIRCUIT FOR SEPARATING LUMINANCE AND CHROMINANCE SIGNALS CONDITIONED ON AN AC LUMINANCE COMPONENT

[75] Inventor: Kazuo Kuroda, Tokorozawa, Japan

[73] Assignee: Pioneer Electronic Corporation, Tokyo, Japan

[21] Appl. No.: 201,829

[22] Filed: Jun. 2, 1988

[51] Int. Cl.⁴ .............................................. H04N 9/78
[52] U.S. Cl. ...................................... 358/31; 358/39
[58] Field of Search ................................... 358/31, 39

[56] References Cited

U.S. PATENT DOCUMENTS

| | | | |
|---|---|---|---|
| 4,694,331 | 9/1987 | Law et al. | 358/31 |
| 4,703,342 | 10/1987 | Takahashi | 358/31 |
| 4,750,033 | 6/1988 | Fukuda et al. | 358/31 |

Primary Examiner—James J. Groody
Assistant Examiner—Robert M. Bauer
Attorney, Agent, or Firm—Foley & Lardner, Schwartz, Jeffery, Schwaab, Mack, Blumenthal & Evans

[57] ABSTRACT

A Y/C separator circuit for separating the luminance and chrominance signals from a color composite video signal includes a comb filter, a filter circuit for extracting an ac component of the luminance signal, an ac component detecting circuit for detecting the level of the ac component of luminance signal and generating an ac component detection signal when the level of the ac component of the luminance signal exceeds a predetermined level, signal leakage detection circuit for detecting a leakage signal between the luminance signal and the chrominance signal on the basis of a difference between information signals of the color composite video signal in adjacent two horizontal scanning periods, and generating a leakage detection signal. The levels of components of the luminance signal in a chroma signal frequency band is reduced in response to an operation command signal when the leakage detection signal is present and the ac component detection signal is absent, thereby alleviating the degradation of the luminance signal.

5 Claims, 4 Drawing Sheets

Y/C SEPARATOR CIRCUIT FOR SEPARATING LUMINANCE AND CHROMINANCE SIGNALS CONDITIONED ON AN AC LUMINANCE COMPONENT

BACKGROUND OF THE INVENTION

1. Field of the Invention

The present invention relates to a Y/C separator circuit for separating a luminance signal and a chroma carrier signal (simply referred to as chroma signal hereinafter) from a color composite video signal (simply referred to as video signal hereinafter).

2. Description of Background Information

An example of conventional Y/C separator circuit will be explained with reference to FIG. 1 of the accompanying drawings.

FIG. 1 shows a Y/C separator circuit in which a comb filter of the 1H delay type is used.

As shown, a video signal is supplied to a 1H delay circuit 1 for delaying the video signal for a delay time corresponding to one horizontal scanning period, and to one of two input terminals of an adder circuit 2 and a substracting circuit 3, respectively. The video signal through the 1H delay line is supplied to the other one of the two input terminals of the adder circuit 2 and the other one of the two input terminals of the subtracting circuit 3 respectively.

Since the same information signals displaced from each other by the time period of 1H include chroma (chrominance) signals whose phase angles are displaced by 180 degrees with each other, the luminance signal is obtained at an output terminal of the adder circuit 2 and the chroma signal is obtained at an output terminal of the subtracting circuit 3.

A component of the luminance signal in the chroma signal band is extracted by means of a band-pass filter 4, and in turn detected by means of a level detector circuit 5. An output signal of the level detector circuit 5 is supplied to a control input terminal of a signal suppressing circuit 6 as a control signal thereof. The luminance signal is also supplied to the signal suppressing circuit 6 after passing through an adder circuit 7.

The chroma signal is supplied to a low-pass filter 8, a level detector circuit 9 and to a chroma signal output terminal. Low frequency and medium frequency components of the luminance signal contained in the chroma signal are extracted at the low-pass filter 8, and sent back to the luminance signal through the adder circuit 7. On the other hand, the chroma signal is detected in level at the level detector circuit 9, and supplied as a control signal to another control input terminal of the signal suppressing circuit 6. The signal suppressing circuit 6 having the same construction as a signal suppressing circuit 40 which will be described later, is constructed such that a trap circuit for reducing signal components in the chroma signal band is inserted in a signal transmission path of the luminance signal when both of the control signals are supplied.

When this construction, in the presence of the chroma signal, the signal suppressing circuit 6 is activated when the chroma signal leads into the luminance signal, thereby reducing the signal components of the luminance signal in the chroma signal band. Thus, it is intended to prevent the generation of the "dot-disturbance" (generation of a fine-dot pattern on the picture) which is generally caused by the leakage of the chroma signal into the luminance signal.

On the other hand, with a video signal having a luminance signal including much of high frequency components extending near to the chroma subcarrier signal and forming a picture of less horizontal line correlation, the level detectors 5 and 9 of the above circuit still generate output signals because of the presence of luminance signal components in the chroma signal band when there is no possibility of generating the dot-disturbance. As a result, the signal suppressing circuit 6 or 9 or both is activated to reduce the high frequency components of the luminance signal, and the quality of the picture is degraded. Also, with the monochromatic (black-and-white) video signal which includes only the luminance signal, if the frequency of the video signal is gradually changed from top to bottom of the picture, like a V(vertical)-sweep, the leakage of the signal also occurs because of less vertical line correlation. Therefore, if the luminance signal includes signal components in the chroma signal band, the signal suppressing circuit is activated to degrade the quality of picture.

OBJECT AND SUMMARY OF THE INVENTION

An object of the present invention is therefore to provide a Y/C separator circuit capable of alleviating the degradation of picture which has been caused by the operation of the signal suppressing circuit for reducing the chroma signal components contained in the luminance signal.

To accomplish the above object, a Y/C separator circuit according to the present invention in which the luminance signal and the chroma carrier signal are separated from a color composite signal using a comb filter, comprises a filter for extracting an ac (alternating current) component from the luminance signal, an ac component detector circuit for generating an ac component detection signal when the level of the ac component exceeds a predetermined level, a signal leakage component detector circuit for detecting a leakage component between the luminance signal and the chroma carrier signal and generating a leakage detection signal, a control circuit for generating an operation command signal when the leakage detection signal is present while the ac component detection signal is absent, and a signal suppressing circuit for reducing the level of the component of the luminance signal in the chroma signal band in response to the operation command signal, thereby activating the signal suppressing circuit when the leakage between the luminance signal and the chroma signal is present and the level of the ac component of the luminance signal is relatively low, and preventing the dot-disturbance.

DETAILED DESCRIPTION OF THE PREFERRED EMBODIMENT

Figure 2:
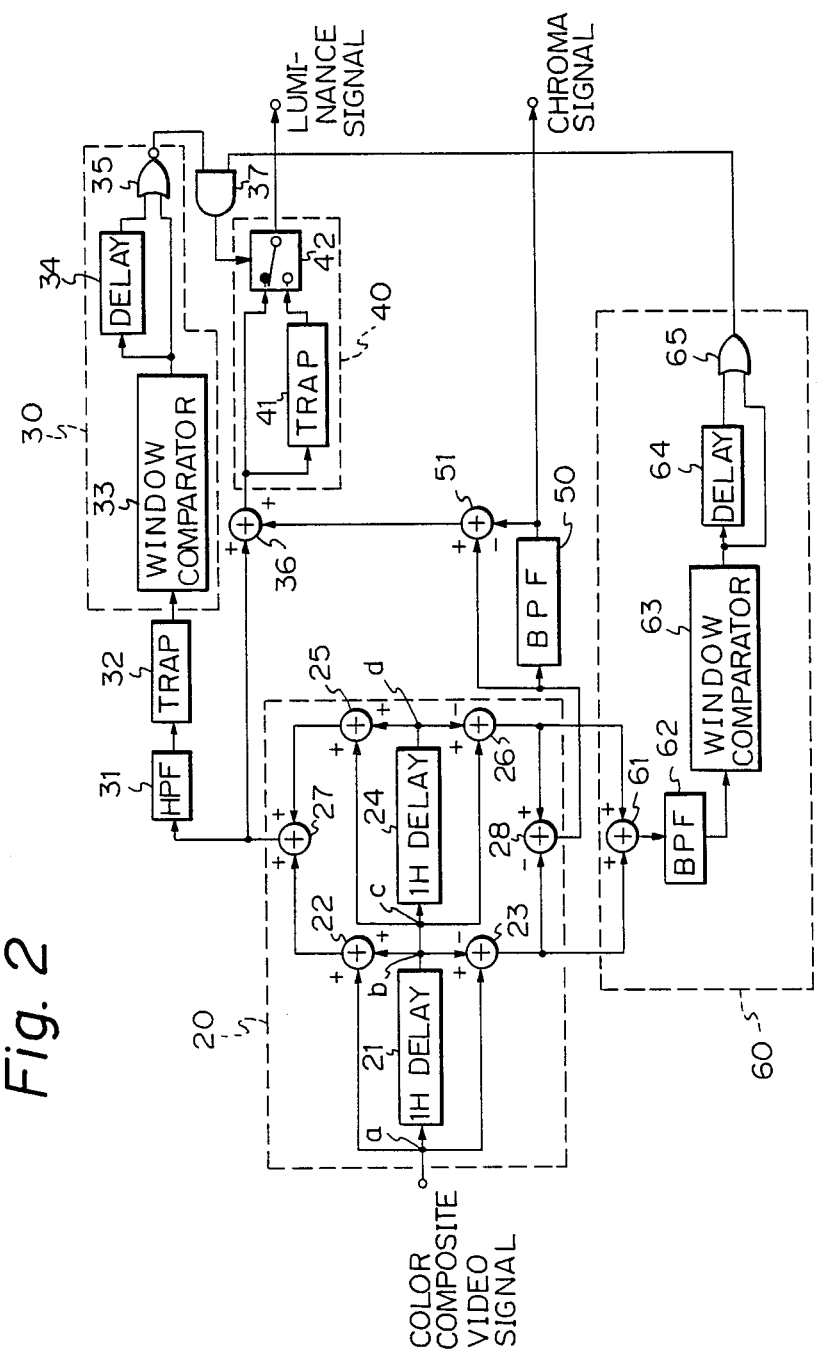
FIG. 2 is a block diagram showing an embodiment of the Y/C separator circuit according to the present invention.

Referring to FIG. 2, the preferred embodiment of the present invention will be explained.

As shown, a video signal is supplied respectively to one of input terminals of a 1H delay circuit 21, an adder circuit 22 and a subtracting circuit 23. An output signal of the 1H delay circuit 21 is supplied respectively to the other one of the input terminals of the adder circuit 22 and the subtracting circuit 23. Thus, the luminance signal is obtained at an output terminal of the adder circuit 22 and the chroma signal is obtained at an output terminal of the subtracting circuit 23. The output signal of the 1H delay circuit 21 is also supplied to one of input terminals of a 1H delay circuit 24, an adder circuit 25, and a subtracting circuit 26, respectively. An output signal of the 1H delay circuit 24 is respectively supplied to the other one of the input terminals of the adder circuit 25 and the subtracting circuit 26, so that the luminance signal and the chroma signal are obtained at an output terminal of the adder circuit 25 and at an output terminal of the subtracting circuit 26, respectively.

Between the luminance signals obtained at the adder circuits 22 and 25, there is a time difference corresponding to the period of 1H, and also the same time difference is present between the chroma signals obtained at the subtracting circuits 23 and 26. With the above arrangement, the circuits 21 through 28 constitute a 2 H type comb filter 20. The output signal of the adder circuit 27 serves as an output luminance signal of the comb filter 20, and the output signal of the subtracting circuit 28 serves as an output signal of the comb filter 20.

This luminance signal is supplied to an ac component detection circuit 30 made up of a window comparator 33, a delay circuit 34 and a NOR gate 35 through a high-pass filter 31 and a trap circuit 32, and to one of input terminals of an adder circuit 36. The high-pass filter 31 extracts the ac component of the luminance signal in the middle and high frequency range. In this ac component, signal components in the chroma signal band are reduced in level by means of the trap circuit 32. The ac signal after passing through the trap circuit 32 is supplied to the window comparator 33. The window comparator 33 is constructed to generate an ac component detection signal when the amplitude of the ac component exceeds a predetermined value which has been previously set in the window comparator 33. The thus generated ac component detection signal is supplied to a waveform shaping circuit which is constituted by the delay circuit 34 and the NOR gate 35. The ac component detection signal after shaping is supplied to one of two input terminals of an AND gate 37.

The chroma signal is supplied to a band-pass filter 50 which permits only signal components in the chroma signal band to pass therethrough, and to one of two input terminals of a subtracting circuit 51. An output signal of the band-pass filter 50 is supplied to the other one of the two input terminals of the subtracting circuit 51 and to a chroma signal output terminal. At the output terminal of the subtracting circuit 51, is generated a leakage signal component in the medium and low frequency range from which the chroma signal component is removed, and this signal component is supplied to the other input terminal of the adder circuit 36, so that it is sent back to the luminance signal.

The luminance signal outputted by the adder circuit 36 is supplied to one of two input terminals of a switch circuit 42 and to the other one of the two input terminals of the switch circuit 42 through a trap circuit 41 which reduces the signal component in the chroma signal range. The trap circuit 41 and the switch circuit 42 together form a signal suppressing circuit 40.

The chroma signals outputted by the subtracting circuits 23 and 26 are supplied to a signal leakage detection circuit 60 which is constituted by an adder circuit 61, a band-pass filter 62, a window comparator 63, a delay circuit 64, and an OR gate 65. The chroma signals outputted from the subtracting circuits 23 and 26 are signals in adjacent two scanning sections. Therefore, the adder circuit 61 does not produce an output signal when the line correlation of luminance signals is high enough and the phase error is equal to 0 degree in adjacent two scanning sections, and the line correlation of the chroma signals in the same scanning sections is also high and the phase difference is equal to 180 degrees.

Since components of the video signal in the said frequency band are contained in the this signal, this signal is supplied to a band-pass filter 62 of the chroma signal band, so that a signal indicating the line correlation in the chroma signal band is extracted, and the extracted signal is supplied to the window comparator 63. When the amplitude of this signal exceeds another predetermined value previously set in the window comparator 63, the latter generates an output signal which in turn is supplied to the other input terminal of the AND gate 37 through a waveform shaping circuit made up of the delay circuit 64 and the OR gate 65. The AND 37 generates a switch circuit operation command signal when both of the input signals are at a high level, causing the switch circuit to select the output signal of the trap circuit 41. In other conditions, the AND gate 37 drives the switch circuit to select the output signal of the adder circuit 36. The output signal of the switch circuit 42 is supplied to the luminance signal output terminal. With this circuit construction, the NOR gate 35 and the AND gate 37 form the control circuit.

Next, the operation of the circuit will be explained hereinafter.

If we designate the input and the output signals of the delay circuits 21 and 24 of the 2 H-type comb filter 20 respectively as a, b, c, and d, the output signal of the adder circuit 27 can be expressed by a+2b+d because b=c. Since the color burst signal is inverted in phase every 1H period, the luminance signal is mainly generated. The output signal of the subtracting circuit 28 is expressed as −(a+d)+2b, in which the luminance signal is canceled, and the chroma signal is mainly obtained. The output signal of the adder circuit 61 is expressed as a−d, and the color burst signals in the input signals are in-phase with each other, and the output signal of the adder circuit 61 becomes equal to 0 when the contents of information of the video signals are the same. For example, when the luminance signal is such a signal as a multi-burst signal, the input signal a and the output signal d have the same luminance signal. On the other hand, in the case of a picture having a single color, the input signal a and the output signal d have the same chroma signal. In other words, the adder circuit 61 generates no output when the line correlation of the luminance signal is high and the phase error is equal to 0 degree, and the line correlation of the chroma signal is high and the phase difference is equal to 180 degrees. On the other hand, it produces output signal when the line correlation is lost in one of the luminance signal and the chroma signal, or in both.

Since the output signal of the adder circuit 61 can contain all of the signal components in the entire band of the video signal, the component in the chroma signal band is extracted by a band-pass filter 62, and whose amplitude is detected by means of the window comparator, so that the degree of the line correlation of the chroma signal can be judged. The output signal of the window comparator is shaped at the delay circuit 64 and the OR gate 65, and in turn supplied to the AND gate 37.

Thus, if the degree of the line correlation is lowered and the predetermined level is exceeded, the leakage detection circuit is outputted from the signal leakage detection circuit 60.

On the other hand, the ac component is extracted by means of the high-pass filter 31 from the luminance signal output of the adder circuit 27, and a chroma signal component including the chroma subcarrier signal is removed from the above ac component by means of the trap circuit 32. When the amplitude of the ac component after passing through the trap circuit 32 exceeds the predetermined value, the output signal is outputted from the window comparator 33. This output signal is converted to a signal which turns to a high level when the ac component having a level higher than the predetermined level is not present, by means of the NOR gate 35 of the waveform shaping circuit, and in turn supplied to the AND gate 37.

The AND gate 37 operates the switch circuit 42 to change-over on the trap circuit 41's side when both of the output signals of the NOR gate 35 and the OR gate 65 are at the high level.

Therefore, if the degree of the line correlation of the chroma signal is reduced and the level of the ac component of the luminance signal is decreased to be lower than a certain value, the luminance signal passed through the trap circuit 41 is supplied to the output terminal, so that the dot-disturbance is eliminated.

On the other hand, even if the degree of the line correlation of the chroma signal is reduced, the trap circuit 41 is by-passed when the level of the above ac component is greater than the certain level, so that the high-frequency characteristic of the luminance signal is maintained to prevent the degradation of the picture quality. In this case, the dot disturbance at a certain level can be generated in the picture. However, since the level of the ac component of the luminance signal is high to a certain degree, the dot disturbance becomes less prominent owing to the masking effect.

On the other hand, if the leakage current is not present the luminance signal will not be suppressed when the level of the ac component is low, and the quality of picture will not be degraded.

Figure 1:
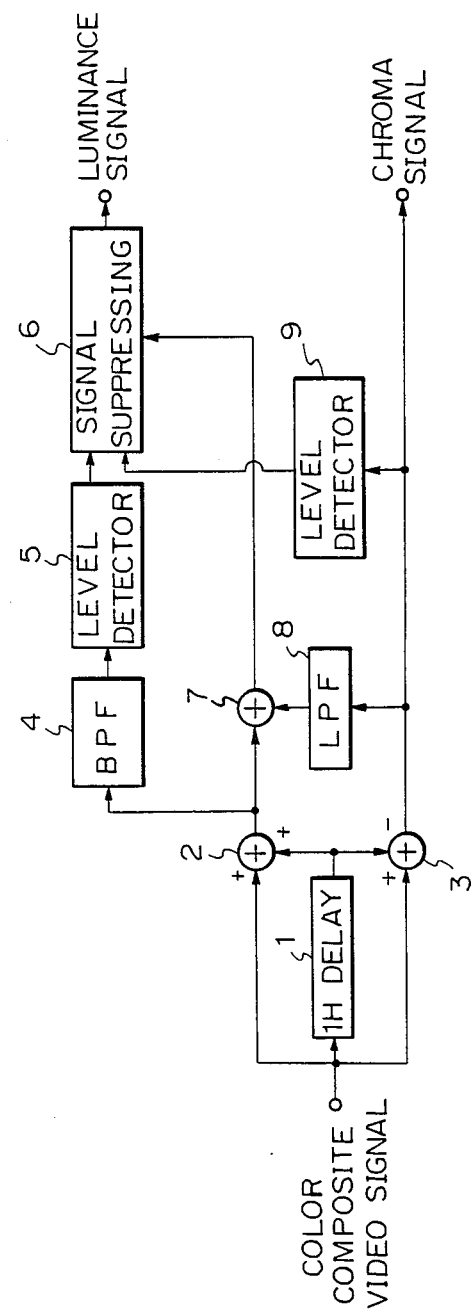
FIG. 1 is a block diagram showing an example of conventional Y/C separator circuit.
Figure 3:
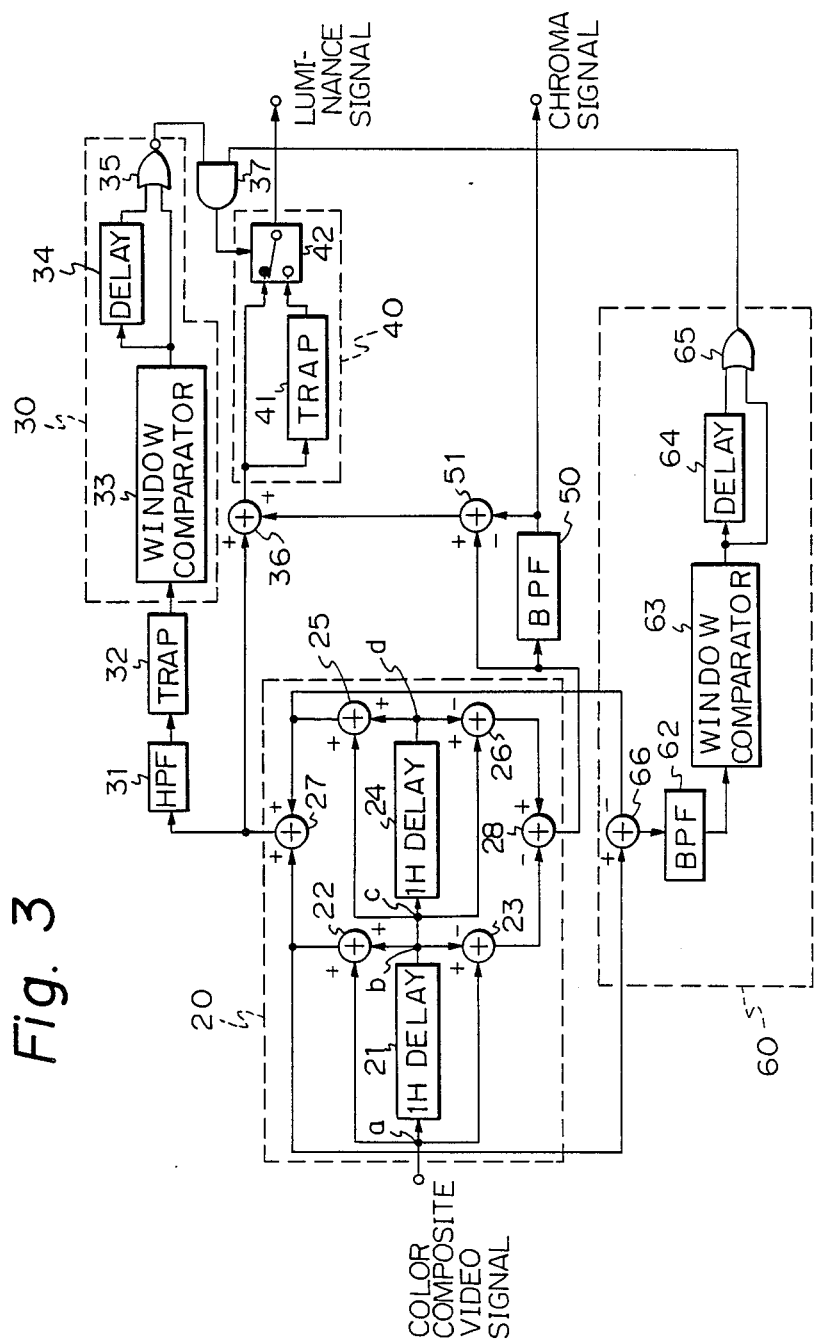
FIGS. 3 and 4 are block diagrams showing modifications of the embodiment shown in FIG. 2.
Figure 4:
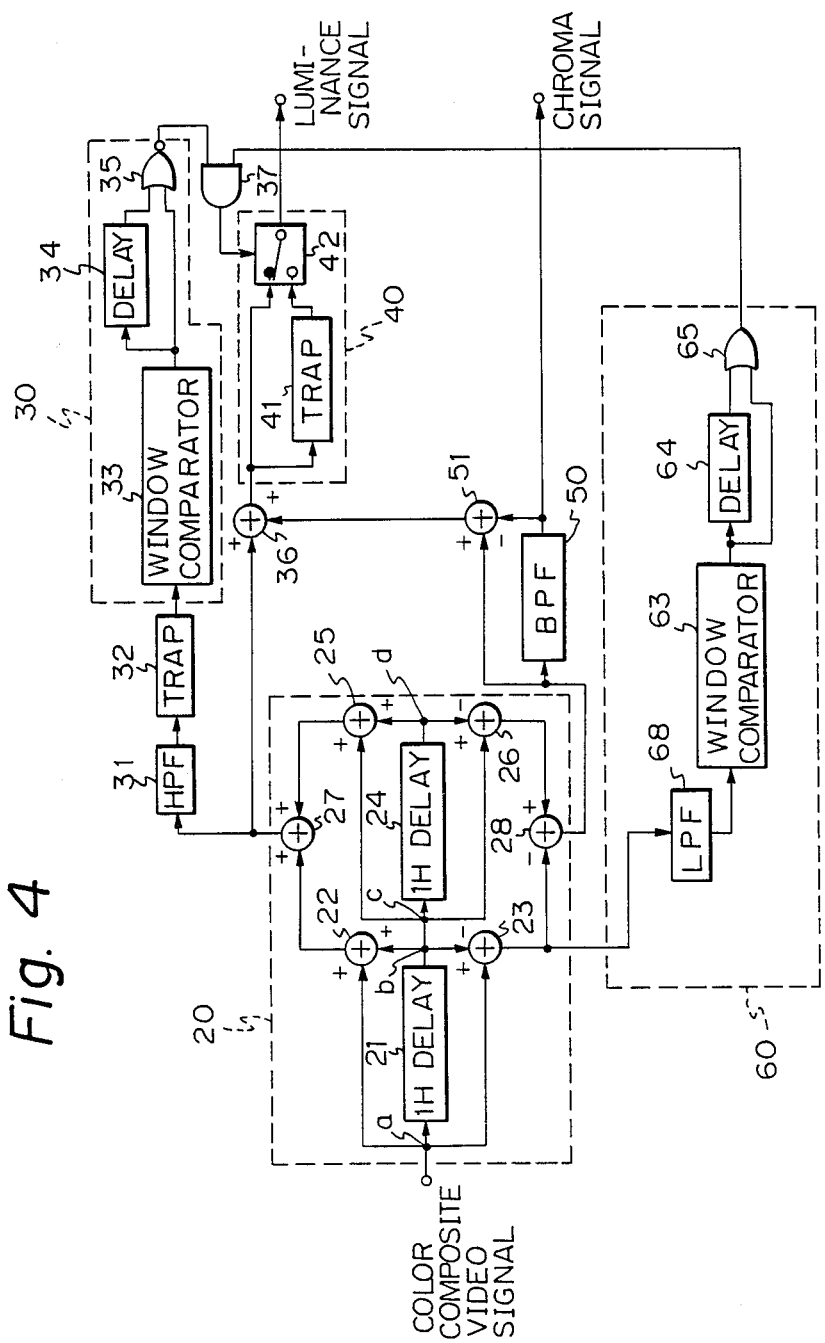

In addition, as shown in FIG. 3, the adder circuit 61 may be replaced by a subtracting circuit 66 which receives the output signals of the adder circuits 22 and 25, or a subtracting circuit which receives the input signal of the first 1H delay line and the output signal of the second 1H delay line. Also, the signal leakage detection circuit 60 can be replaced by other circuit which is capable of detecting the signal leakage component. For instance, if the signal leakage component is obtained by using the output signal of a low-pass filter 68 shown in FIG. 4 corresponding to the low-pass filter 8 shown in FIG. 1, similar effects of a certain degree can be attained. Furthermore, although the comb filter of 2H type is utilized in the above embodiment, this is not limitative and a comb-filter of 1H type may be used as in the conventional arrangement. In addition, the high-pass filter 31 for extracting the ac component can be replaced by a band-pass filter.

As will be appreciated from the foregoing, in the Y/C separator circuit according to the present invention, the chroma signal trap circuit is inserted into the luminance signal transmission path only when the level of the ac component of the luminance signal is low, and the leakage signal is existing between the separated luminance signal and the chroma signal. Thus, the operation of the signal suppressing circuit for coping with the generation of the dot-disturbance in the reproduced picture is controlled more appropriately according to the present invention. Therefore, the chances of degrading the picture quality is decreased as compared with the conventional arrangement.

What is claimed is:

1. A Y/C separator circuit for separating luminance and chrominance signals from a composite video signal, comprising:
    a comb filter for receiving said composite video signal and outputting said luminance and chrominance signals separately;
    a filter means connected to said comb filter, for extracting an ac (alternating current) component of said luminance signal;
    an ac component detecting means connected to said filter means, for detecting a level of said ac component of said luminance signal and generating an ac component detection signal when the level of said ac component of said luminance signal exceeds a predetermined level;
    signal leakage detection circuit means connected to said comb filter, for detecting a leakage signal between said luminance signal and said chrominance signal on the basis of a difference between information signals of said color composite video signal in two adjacent horizontal scanning periods, and generating a leakage detection signal when said difference exceeds a predetermined value;
    control circuit means connected to said ac component detecting means and said signal leakage detecting circuit means, for generating an operation command signal when said leakage detection signal is present and said ac component detection signal is absent; and
    a signal suppressing circuit means connected to said comb filter and said control circuit means for reducing levels of components of said luminance signal in a chroma signal frequency band in response to said operation command signal.

2. A Y/C separating circuit as set forth in claim 1, wherein said filter means includes a trap circuit for reducing signal components in said chroma signal frequency band.

3. A Y/C separating circuit as set forth in claim 1, wherein said comb filter includes a delay circuit for delaying said color composite video signal for a delay time corresponding to one horizontal scanning period and wherein said signal leakage detection circuit means comprises a subtracting circuit means connected to said delay circuit means, for generating a subtraction signal between input and output signals of said delay circuit means; a low-pass filter connected to said subtraction circuit means, for extracting a low-frequency component of said subtraction signal generated by said subtraction circuit means; and a level detection circuit means connected to said low-pass filter, for generating said leakage detection signal when a level of an output signal of said low-pass filter exceeds a predetermined value.

4. A Y/C separator circuit as set forth in claim 1, wherein said comb filter comprises:
- a first delay circuit means for delaying said color composite video signal for a delay time corresponding to one horizontal scanning period;
- a second delay circuit means connected in series to said first delay circuit means for delaying said color composite video signal from said first delay means for said delay time corresponding to one horizontal scanning period;
- a first subtracting circuit means connected to said first delay circuit means, for generating a first subtraction signal between input and output signals of said first delay means;
- a second subtracting circuit means connected to said second delay circuit means, for generating a second subtraction signal between input and output signals of said second delay means, and wherein said signal leakage detection circuit means comprises:
- an adder circuit means for adding output signals of said first and second subtracting circuit means; and
- a level detection circuit means connected to said adder circuit means, for generating said leakage detection signal when a level of an output signal of said adder circuit means exceeds a predetermined value.

5. A Y/C separator circuit as claimed in claim 1, wherein said comb filter comprises:
- a first delay circuit means for delaying said color composite video signal for a delay time corresponding to one horizontal scanning period;
- a second delay circuit means connected in series to said first delay circuit means for delaying said color composite video signal from said first delay means for said delay time corresponding to one horizontal scanning period;
- a first adder circuit means connected to said first delay circuit means, for generating a summing signal of input and output signals of said first delay means;
- a second adder circuit means connected to said second delay circuit means, for generating a summing signal of input and output signals of said delay means, and wherein said signal leakage detection circuit means comprises:
- a subtraction circuit means for generating a subtracting signal between output signals of said first and second adder circuit means, and
- a level detection circuit means connected to said subtraction circuit means, for generating said leakage detection signal when a level of an output signal of said subtraction circuit means exceeds a predetermined value.

* * * * *

UNITED STATES PATENT AND TRADEMARK OFFICE
CERTIFICATE OF CORRECTION

PATENT NO. : 4,862,252
DATED : August 29, 1989
INVENTOR(S) : KURODA

It is certified that error appears in the above-identified patent and that said Letters Patent is hereby corrected as shown below:

Title page:

--[30]   Foreign Application Priority Data

June 12, 1987 [JP]  Japan.........P62-146270.--

Signed and Sealed this

Second Day of March, 1993

Attest:

STEPHEN G. KUNIN

*Attesting Officer*          *Acting Commissioner of Patents and Trademarks*